United States Patent
Ooba (10) Patent No.: US 11,281,906 B2
(45) Date of Patent: Mar. 22, 2022

(54) MONITOR DEVICE PROVIDED WITH CAMERA FOR CAPTURING MOTION IMAGE OF MOTION OF ROBOT DEVICE

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/897,279

(22) Filed: Jun. 10, 2020

(65) Prior Publication Data

US 2020/0401801 A1   Dec. 24, 2020

(30) Foreign Application Priority Data

Jun. 21, 2019   (JP) .............................. JP2019-115797

(51) Int. Cl.
*G06K 9/00* (2022.01)
*H04N 5/76* (2006.01)
*H04N 7/18* (2006.01)
*G06T 7/20* (2017.01)

(52) U.S. Cl.
CPC ............ *G06K 9/00664* (2013.01); *G06T 7/20* (2013.01); *H04N 5/76* (2013.01); *H04N 7/18* (2013.01)

(58) Field of Classification Search
CPC ......... G06K 9/00664; G06T 7/20; H04N 7/18
See application file for complete search history.

(56) References Cited

U.S. PATENT DOCUMENTS

| | | | |
|---|---|---|---|
| 2009/0265035 A1* | 10/2009 | Jenkinson | G06K 9/03 700/259 |
| 2011/0224826 A1* | 9/2011 | Maehara | B25J 9/1676 700/255 |
| 2018/0243898 A1* | 8/2018 | Hashimoto | B25J 9/1638 |
| 2018/0264347 A1* | 9/2018 | Tran | A63B 71/145 |
| 2018/0341812 A1* | 11/2018 | Floor | G06K 9/00724 |
| 2019/0154871 A1* | 5/2019 | Leduc | G08B 13/1895 |

FOREIGN PATENT DOCUMENTS

| | | |
|---|---|---|
| JP | 20171114 A | 1/2017 |
| JP | 201713214 A | 1/2017 |
| JP | 2017154221 A | 9/2017 |
| JP | 2018202541 A | 12/2018 |
| WO | 2018131237 A1 | 7/2018 |

* cited by examiner

*Primary Examiner* — Sunghyoun Park
(74) *Attorney, Agent, or Firm* — Hauptman Ham, LLP (57) ABSTRACT

A monitor device includes a camera for capturing a motion image of a motion of a robot device and an acceleration sensor for detecting an operational status of the robot device. A storage control unit for a robot controller performs control for storing, in a storage unit, a motion image captured by the camera and attached with a time, and control for storing, in the storage unit, an acceleration acquired from an acceleration sensor and attached with a time. When the operational status of the robot device deviates from a reference operational status, an extraction unit extracts, from the storage unit, a motion image in a period preceding the deviation from the reference operational status and stores the extracted motion image in the storage unit.

9 Claims, 5 Drawing Sheets

MONITOR DEVICE PROVIDED WITH CAMERA FOR CAPTURING MOTION IMAGE OF MOTION OF ROBOT DEVICE

RELATED APPLICATIONS

The present application claims priority to Japanese Application Number 2019-115797, filed Jun. 21, 2019, the disclosure of which is hereby incorporated by reference herein in its entirety.

BACKGROUND OF THE INVENTION

1. Field of the Invention

The present invention relates to a monitor device provided with a camera for capturing a motion image of a motion of a robot device.

2. Description of the Related Art

In a robot device including a robot, a desired operation can be performed by attaching an operation tool corresponding to the operation to the robot. For example, the operation tool may be a hand attached to the robot so as to grip a workpiece. After the robot reaches a predetermined position and posture, a workpiece can be transferred by the hand that holds or releases the workpiece.

The robot and the operation tool are driven based on a created motion program. However, the operation of the robot device may not be normally performed depending upon the occurrence of an abnormality or a status around the robot device being driven. A camera may be disposed in the robot device in order to identify a status of the robot device or a status around the robot device during an operation period of the robot device.

In the related art, a driving status of a robot is determined by a known device based on a motion image or a still image that is captured by a camera (for example, Japanese Unexamined Patent Publication No. 2017-13214A, Japanese Unexamined Patent Publication No. 2017-1114A, and Japanese Unexamined Patent Publication No. 2017-154221A). Moreover, in a known robot device that allows collaboration between an operator and a robot, a camera is provided for detecting the operator approaching the robot (for example, WO 2018/131237A1). Furthermore, in a known device, an image of an area of an operating robot device is captured by a camera and the image is displayed on a display unit (for example, Japanese Unexamined Patent Publication No. 2018-202541A).

SUMMARY OF THE INVENTION

If an operation is not normally performed by a robot device, the robot device may be stopped. For example, in some cases, a predetermined part may be attached or welded to a workpiece transferred by an automatic guided vehicle. In this case, the workpiece placed on the vehicle may vibrate due to an uneven ground surface or an air flow in a factory. As a result, when an operation tool comes into contact with the workpiece, the robot device may detect vibrations and stop. Alternatively, in the event of a failure of a device included in the robot device, a robot may largely vibrate and the robot device stops.

In order to examine the cause of an abnormality in the robot device, it is preferable to visually observe a status of the robot device when the abnormality occurs. For visual observation, when an operation is not normally performed by the robot device, an operator captures a motion image with a camera while operating the robot device to perform the same operation again. Thus, the analysis of the cause is a time-consuming work for the operator.

The operator analyzes the cause of the abnormality based on the motion images and records of the operations of the robot device. However, a correspondence between an operation record of the robot device and a time in a motion image cannot be identified. Since information on a correspondence between an operation record of the robot device and a time in a motion image is not provided, it is difficult to analyze the cause of an abnormality with reference to the motion image and the operation record of the robot at the occurrence of the abnormality. Hence, in the related art, it is difficult to analyze the cause of an abnormality in a short time, resulting in a long recovery time for the robot device.

An aspect of the present disclosure is a monitor device for monitoring a motion of a robot device including a robot and an operation tool attached to the robot. The monitor device includes a camera for capturing a motion image of a motion of the robot device and a status detector for detecting an operational status of the robot device. The monitor device includes an arithmetic processing device for acquiring a motion image captured by the camera and the output of the status detector. The arithmetic processing device includes a storage unit for storing predetermined information and a storage control unit for operating the information stored in the storage unit. The arithmetic processing device includes an extraction unit for extracting part of the information stored in the storage unit and a determination unit for determining an operational status of the robot device. The storage control unit performs control for storing a motion image in the storage unit, the image being captured by the camera and attached with a time or an elapsed time from a predetermined reference time, and control for storing a variable number in the storage unit, the variable number being acquired from the output of the status detector and attached with a time or the elapsed time. The storage control unit performs control for deleting a motion image captured before a predetermined period preceding a current time. The determination unit determines whether the operational status of the robot device deviates from a predetermined reference operational status. If the determination unit determines that the operational status of the robot device deviates from the reference operational status, the extraction unit extracts, from the storage unit, a motion image in a predetermined period including a period preceding the deviation from the reference operational status and stores the extracted motion image in the storage unit.

DETAILED DESCRIPTION

Referring to FIGS. 1 to 7, a monitor device that monitors a motion of a robot device according to an embodiment will be described below. In the present embodiment, the robot device for assembling parts will be described as an example.

Figure 1:
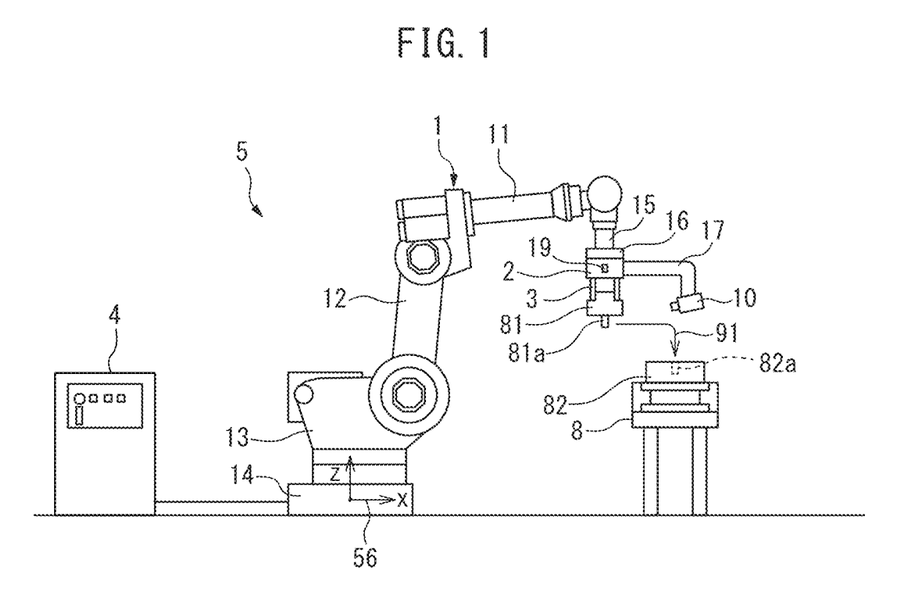
FIG. 1 is a schematic diagram of a first robot device according to an embodiment.

FIG. 1 is a schematic diagram of a first robot device according to the present embodiment. A first robot device 5 includes a hand 2 acting as an operation tool (end effector) and a robot 1 that moves the hand 2. The robot 1 of the present embodiment is an articulated robot including a plurality of joints.

The robot 1 includes a base part 14 and a rotation base 13 supported by the base part 14. The base part 14 is fixed to an installation surface. The rotation base 13 is formed so as to rotate relative to the base part 14. The robot 1 includes an upper arm 11 and a lower arm 12. The lower arm 12 is pivotally supported by the rotation base 13 via the joint. The upper arm 11 is pivotally supported by the lower arm 12 via the joint. The upper arm 11 rotates about a rotary axis parallel to a direction along which the upper arm 11 extends.

The robot 1 includes a wrist 15 connected to one end of the upper arm 11. The wrist 15 is pivotally supported by the upper arm 11 via the joint. The wrist 15 includes a rotatably formed flange 16. The hand 2 is fixed to the flange 16 of the wrist 15. The robot 1 of the present embodiment is a robot having six drive axes, but the embodiment is not limited to this. Any robot capable of moving the operation tool may be used.

The hand 2 is an operation tool that grips and releases a workpiece 81. The hand 2 has a plurality of claws 3. The hand 2 is formed so as to open and close the claws 3. The claws 3 catch the workpiece 81 so as to grip the workpiece 81. The hand 2 of the present embodiment has the claws 3 but the configuration is not limited thereto. The hand may have any configuration formed so as to grip the workpiece. For example, a hand that grips a workpiece by suction or a magnetic force may be used.

The robot device 5 of the present embodiment includes a conveyor 8 that acts as a transporter for transferring a workpiece 82 to the robot 1. The transporter is disposed around the robot 1. The conveyor 8 is formed so as to transfer the workpiece 82 to a predetermined position.

The robot device 5 of the present embodiment attaches the workpiece 81 to the workpiece 82. The workpiece 81 has a pin 81a projecting from the surface. The workpiece 82 to be transferred by the conveyor 8 has a hole 82a that agrees with the shape of the pin 81a. The robot device 5 grips the workpiece 81 disposed on a work table, which is not illustrated in the figures. Subsequently, the position and posture of the robot 1 are changed so as to place the workpiece 81 on the top surface of the workpiece 82 as indicated by an arrow 91. At this point, the robot 1 moves the workpiece 81 so as to fit the pin 81a into the hole 82a.

In the present embodiment, the robot 1 attaches the workpiece 81 to the workpiece 82 while the conveyor 8 continues transferring the workpiece 82. In other words, the workpiece 82 is moved by the conveyor 8 in a period during which the workpiece 81 is placed. The robot 1 attaches the workpiece 81 to the workpiece 82 while changing the position and posture so as to follow the workpiece 82.

The robot device 5 of the present embodiment includes a camera 10 that captures an image of a motion of the robot device 5. The camera 10 is a video camera that captures a motion image. The camera 10 is disposed so as to capture an image of a state in which the hand 2 performs an operation to the workpieces 81 and 82. The camera 10 of the present embodiment is disposed so as to capture an image of an area where the workpiece 81 is placed on the workpiece 82. In particular, the camera 10 is disposed so as to capture an image of a state in which the pin 81a is inserted into the hole 82a.

In the first robot device 5, the camera 10 is fixed to the hand 2 by a support member 17. The position and orientation of the camera 10 are changed along with the hand 2. The camera 10 of the present embodiment is formed so as to be removed from the hand 2. For example, the support member 17 can be fixed to the hand 2 by a magnet or a fastener, e.g., a screw.

In the robot device 5 of the present embodiment, a reference coordinate system 56 is set. In the example of FIG. 1, the origin of the reference coordinate system 56 is disposed in the base part 14 of the robot 1. The reference coordinate system 56 is also referred to as a world frame. The reference coordinate system 56 is a frame where the position of the origin is fixed and the directions of coordinate axes are fixed. Even if the position and posture of the robot 1 are changed, the position and orientation of the reference coordinate system 56 remain unchanged. The reference coordinate system 56 has, as coordinate axes, the X-axis, the Y-axis, and the Z-axis that are orthogonal to one another. Moreover, the W-axis is set as a coordinate axis around the X-axis. The P-axis is set as a coordinate axis around the Y-axis. The R-axis is set as a coordinate axis around the Z-axis.

The positions and postures of the robot 1 can be expressed by the reference coordinate system 56. For example, the positions of the robot 1 can be expressed by the position of a tool center point disposed at the tip of the hand 2. Moreover, a tool coordinate system that moves with the hand 2 can be set at the tool center point. The postures of the robot 1 can be expressed by the orientations of the tool coordinate system relative to the reference coordinate system 56.

Figure 2:
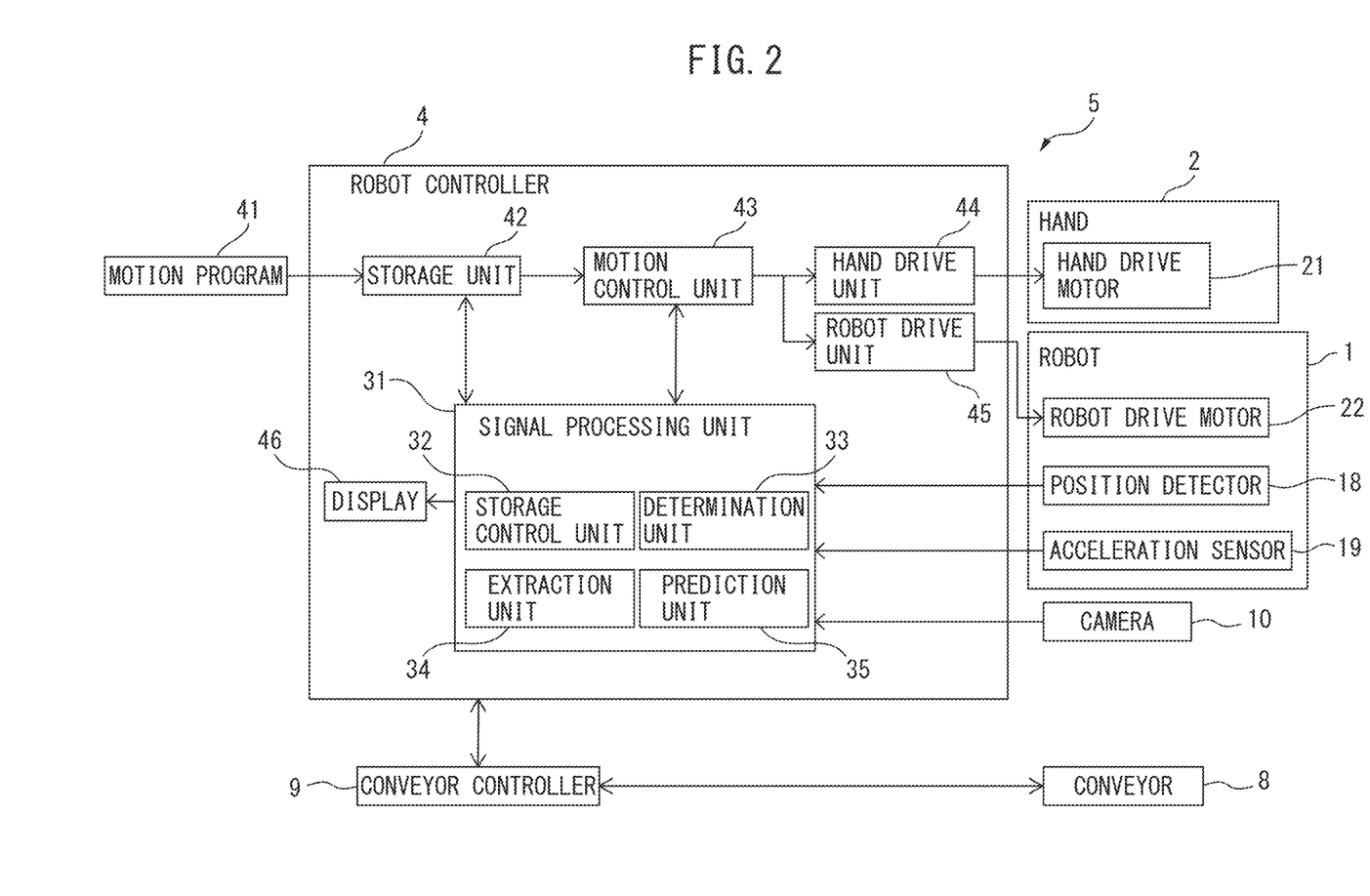
FIG. 2 is a block diagram of the first robot device according to the embodiment.

FIG. 2 is a block diagram illustrating the robot device according to the present embodiment. Referring to FIGS. 1 and 2, the robot 1 includes a robot drive device that changes the position and posture of the robot 1. The robot drive device includes a robot drive motor 22 that drives components such as an arm and a wrist. The driving of the robot drive motor 22 changes the orientations of the components.

The hand 2 includes a hand drive device that drives the hand 2. The hand drive device includes a hand drive motor 21 that drives the claws of the hand 2. The driving of the hand drive motor 21 opens or closes the claws 3 of the hand 2. The claws may be formed so as to be activated by an air pressure. In this case, the hand drive device may include an air pump or a barrel, that is, a device for driving the claws by an air pressure.

A controller for the robot device 5 includes a robot controller 4. The robot controller 4 includes an arithmetic processing device (computer) having a central processing unit (CPU) as a processor. The arithmetic processing device includes RAM (Random Access Memory) and ROM (Read Only Memory) that are connected to the CPU via a bus. A motion program 41 created in advance for controlling the robot 1, the hand 2, and the conveyor 8 is inputted to the robot controller 4. The robot 1 and the hand 2 transfer the workpiece 81 based on the motion program 41. The conveyor 8 transfers the workpiece 82 based on the motion program 41.

The arithmetic processing device of the robot controller 4 includes a storage unit 42 that stores predetermined information. The storage unit 42 stores information on the control of the robot 1, the hand 2, and the conveyor 8. The motion program 41 is stored in the storage unit 42. The storage unit 42 may include a storage medium capable of storing information, such as a volatile memory, a nonvolatile memory, or a hard disk.

The arithmetic processing device includes a motion control unit 43 that transmits a motion command. The motion control unit 43 is equivalent to a processor driven according to the motion program 41. The motion control unit 43 is formed so as to read information stored in the storage unit 42. The processor reads the motion program 41 and performs control as determined in the motion program 41, so that the processor acts as the motion control unit 43.

The motion control unit 43 transmits a motion command for driving the robot 1, based on the motion program 41, to a robot drive unit 45. The robot drive unit 45 includes an electric circuit that drives the robot drive motors 22. The robot drive unit 45 supplies electricity to the robot drive motors 22 based on the motion command. The motion control unit 43 transmits the motion command for driving the hand 2 to a hand drive unit 44 based on the motion program 41. The hand drive unit 44 includes an electric circuit that drives the hand drive motor 21. The hand drive unit 44 supplies electricity to the hand drive motor 21 based on the motion command. The motion control unit 43 transmits a command for capturing a motion image, to the camera 10 based on the motion program 41.

The robot controller 4 includes a display 46 that displays any information on the robot device 5. The display 46 includes, for example, a liquid crystal display panel.

The robot device 5 includes at least one status detector that detects the operational status of the robot device 5. The status detector is attached to a member constituting the robot device 5. The robot 1 includes a position detector 18 acting as a status detector for detecting the position and posture of the robot 1. The position detector 18 is attached to the robot drive motor 22 that corresponds to the drive axis of a component such as an arm. For example, the position detector 18 detects a rotation angle when the robot drive motor 22 is driven. The position and posture of the robot 1 are detected based on the output of the position detector 18.

The status detector of the present embodiment includes an acceleration sensor 19 for detecting the acceleration of the robot 1. The acceleration sensor 19 is attached to the hand 2. According to the output of the acceleration sensor 19, the acceleration and vibrations of the robot 1 being driven can be detected.

The controller of the robot device 5 includes a conveyor controller 9 that controls the operation of the conveyor 8. The conveyor controller 9 includes an arithmetic processing device (computer) that includes a CPU as a processor and RAM. The conveyor controller 9 is formed so as to communicate with the robot controller 4. The motion control unit 43 transmits a motion command for driving the conveyor 8, to the conveyor controller 9 based on the motion program 41. The conveyor controller 9 receives the motion command from the robot controller 4 and drives the conveyor 8.

The robot device 5 of the present embodiment includes a monitor device that monitors a motion of the robot device 5. The monitor device includes the camera 10, the position detector 18 acting as a status detector, and the acceleration sensor 19. The monitor device includes an arithmetic processing device that acquires a motion image captured by the camera 10 and the output of the status detector. In the present embodiment, the arithmetic processing device of the robot controller 4 acts as the arithmetic processing device of the monitor device.

The arithmetic processing device of the robot controller 4 includes a signal processing unit 31 that processes information outputted from the status detector and the camera 10. The signal processing unit 31 includes a storage control unit 32 that operates the information stored in the storage unit 42. The signal processing unit 31 includes an extraction unit 34 that extracts part of the information stored in the storage unit 42. The signal processing unit 31 further includes a determination unit 33 that determines the operational status of the robot device 5. Moreover, the signal processing unit 31 of the present embodiment includes a prediction unit 35 that predicts a future motion of the robot device 5 based on a past operational status of the robot device 5.

The signal processing unit 31 is equivalent to the processor driven according to the motion program 41. The storage control unit 32, the determination unit 33, the extraction unit 34, and the prediction unit 35 are particularly equivalent to the processor driven according to the motion program 41. The processor reads the motion program 41 and perform control as determined in the motion program 41, so that the processor acts as each of the units.

The controller of the robot device 5 according to the present embodiment includes the robot controller 4 that controls the robot 1 and the hand 2 and the conveyor controller 9 that controls the conveyor 8. The embodiment is not limited to this configuration. The robot device 5 may be formed so as to control the robot 1, the hand 2, and the conveyor 8 by means of a single controller. In addition to the robot controller 4, a signal processing device having the function of the signal processing unit 31 may be disposed. The signal processing device may be formed by a storage unit and an arithmetic processing device (computer) including a CPU. The signal processing device may perform control for storing information in the storage unit and control for extracting part of the information stored in the storage unit. Alternatively, the processing for signals from the detector, the sensor, and the camera may be shared while a time in the signal processing device and a time in the robot controller 4 are synchronized with each other.

Referring to FIG. 1, the camera 10 of the present embodiment is disposed at a position remote from the workpiece 81 gripped by the hand 2. The camera 10 is disposed so as to capture an image of the pin 81*a* of the workpiece 81 and the hole 82*a* of the workpiece 82 when the workpiece 81 is attached to the workpiece 82.

Figure 3:
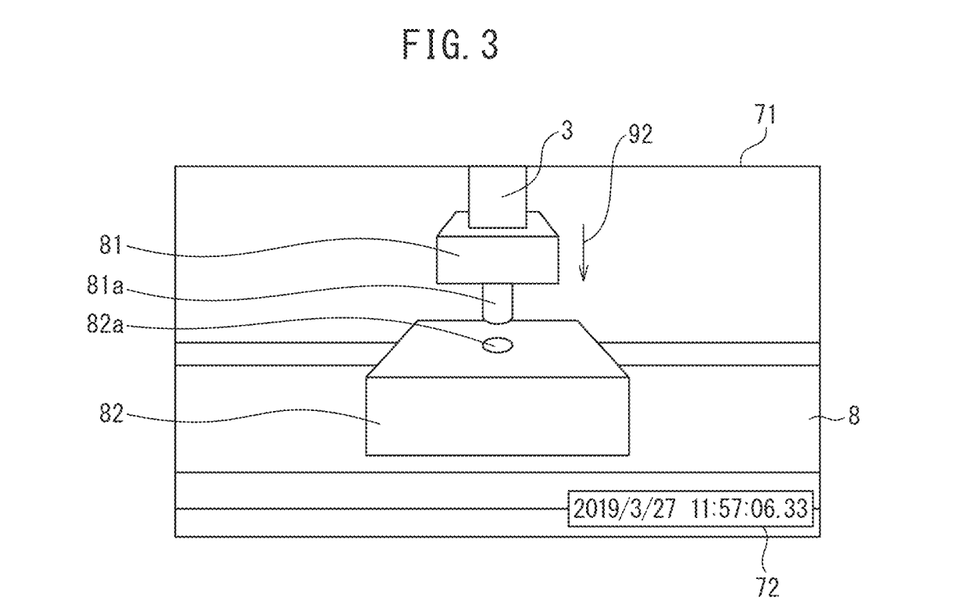
FIG. 3 illustrates an example of video captured by a camera according to the embodiment.

FIG. 3 illustrates an example of video stored in the storage unit. Referring to FIGS. 2 and 3, the storage control unit 32 acquires a motion image captured by the camera 10. The robot controller 4 has the function of a clock. The storage control unit 32 acquires the current time. The storage control unit 32 attaches a time to a motion image captured by the camera 10 and stores the motion image in the storage unit 42. In other words, the storage control unit 32 attaches a current time stamp to a motion image and stores the motion image in the storage unit 42.

A status in which the pin 81*a* of the workpiece 81 and the hole 82*a* of the workpiece 82 transferred by the conveyor 8 are engaged is recorded in video 71. The workpiece 81 gripped by the claws 3 moves in the direction of an arrow 92, whereby the pin 81*a* is inserted into the hole 82*a*. The camera 10 captures images of a state in which the robot device 5 performs an operation to the workpieces 81 and 82. A time stamp 72 is attached to a predetermined position on the video 71. The video 72 indicates a date and a time when the motion image is captured. In the example of FIG. 3, a time is indicated in increments of one hundredths of a second.

The storage control unit 32 of the present embodiment performs control for deleting an old motion image stored in the past. The storage control unit 32 performs control for deleting, from the storage unit 42, a motion image captured before a predetermined period preceding a current time. A period for retaining the motion image can be set at, for example, one to sixty minutes. The storage unit 42 needs to have an enormous storage capacity of motion images. In the present embodiment, an increase in the storage capacity of motion images can be suppressed by deleting old motion images. For example, the storage control unit 32 can perform control for storing, in the storage unit 42, a motion image captured by the camera 10 at a current time and deleting a motion image captured before the period preceding the current time by thirty minutes.

Figure 4:
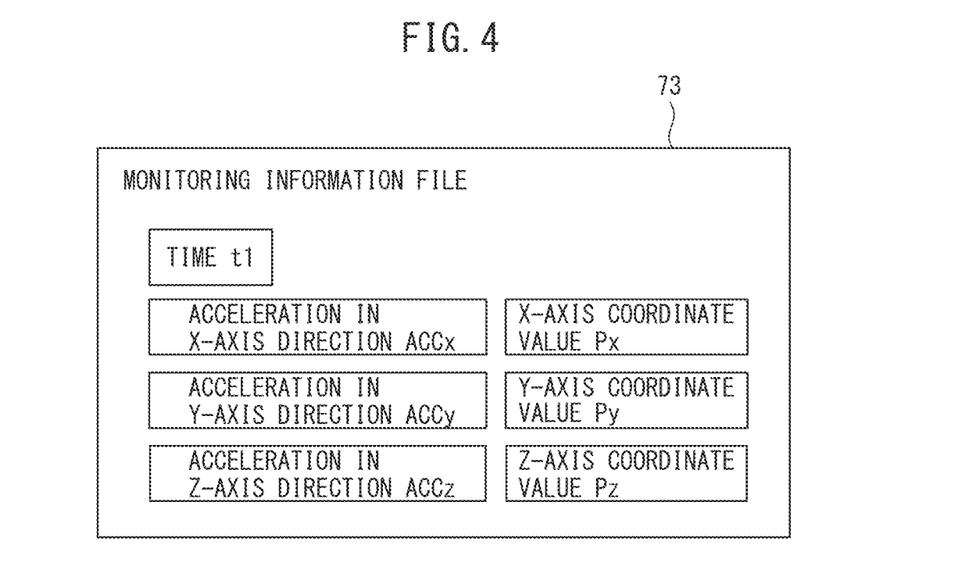
FIG. 4 is a block diagram for explaining items included in a monitoring information file according to the embodiment.

FIG. 4 is an explanatory drawing of a monitoring information file according to the present embodiment. The storage control unit 32 of the present embodiment performs control for recording an operational status of the robot device 5 as monitoring information in a monitoring information file 73 during an operation period of the robot device 5. The monitoring information file 73 is stored in the storage unit 42. The storage control unit 32 performs control for attaching a time to a variable number acquired from the output of the status detector and storing the variable number in the storage unit 42. The operational status of the robot 1 is, for example, the acceleration of the robot 1 and the position of the robot 1. At least one of the acceleration of the robot 1 and the position of the robot 1 can be recorded in the monitoring information file 73.

In the present embodiment, the acceleration of the robot 1 is an acceleration acquired from the output of the acceleration sensor 19. The storage control unit 32 acquires an acceleration in the X-axis direction, an acceleration in the Y-axis direction, and an acceleration in the Z-axis direction of the reference coordinate system 56, the respective accelerations being outputted from the acceleration sensor 19. The accelerations are attached with times and are stored in the monitoring information file 73. Moreover, the storage control unit 32 acquires the position of the robot 1, the position being calculated based on the output of the position detector 18 attached to the robot drive motor 22. The coordinate value of the X-axis, the coordinate value of the Y-axis, and the coordinate value of the Z-axis in the reference coordinate system 56 of the robot 1 are stored in the monitoring information file 73.

In the example of FIG. 4, the acceleration of the robot 1 and the position of the robot 1 at time t1 are indicated. In the monitoring information file 73, variable numbers acquired from the output of the status detector at predetermined time intervals are stored. In other words, variable numbers at respective times are stored in the monitoring information file 73. An actual measured value obtained by the status detector is attached with a time stamp and is recorded in the monitoring information file 73. The variable numbers can be recorded in the monitoring information file 73 in time sequence.

In the present embodiment, the storage control unit 32 stores an acceleration and a position of the robot in the storage unit 42 at each time during a period when the robot device 5 is driven. The embodiment is not limited to this configuration. The storage control unit may perform control for deleting a variable number acquired before the predetermined period preceding a current time.

Referring to FIG. 2, the determination unit 33 determines whether the operational status of the robot device 5 deviates from a predetermined reference operational status during the operation period of the robot device 5. The reference operational status corresponds to a state where the robot device 5 is operated within a normal operation range. The determination unit 33 of the first robot device 5 determines whether the robot 1, the hand 2, and the conveyor 8 are normally operated or not. The determination unit 33 determines whether a variable number acquired from the output of the status detector deviates from a predetermined determination range. If a variable number acquired from the output of the status detector deviates from the determination range, it can be determined that the operational status of the robot device 5 has deviated from the reference operational status. In other words, it can be determined that the operational status of the robot device 5 is abnormal.

For example, the determination range of the acceleration of the robot 1 can be determined in advance. If an acceleration acquired by the acceleration sensor 19 exceeds the determination range, the determination unit 33 can determine that the operational status of the robot device 5 has deviated from the reference operational status. Alternatively, the determination range of positions reachable by the robot 1 can be determined in advance. If a calculated position of the robot device 1 from the output of the status detector 18 deviates from the determination range, the determination unit 33 can determine that the operational status of the robot device 5 has deviated from the reference operational status.

A variable number for determining whether the operational status of the robot device 5 deviates from the reference operational status may be identical to or different from variable numbers recorded in the monitoring information file 73. The determination unit can perform any control for determining whether the operational status of the robot device has deviated from the reference operational status. For example, if a command value transmitted from the motion control unit 43 and a measured value from, for example, the output of the position detector 18 are deviated from each other, the determination unit may determine that the operational status of the robot device 5 has deviated from the reference operational status.

If the determination unit 33 determines that the operational status of the robot device 5 has deviated from the reference operational status, the signal processing unit 31 displays the deviation of the operational status of the robot device 5 from the reference operational status on the display 46. The occurrence of an abnormality of the robot device 5 can be notified to an operator. Moreover, the signal processing unit 31 may transmit a command for stopping the robot device 5 to the motion control unit 43. The motion control unit 43 can stop the robot device 5 based on the command. Furthermore, the motion control unit 43 can retract the robot 1 so as to place the position of robot 1 at a safe position based on the command.

The extraction unit 34 acquires the time of deviation from the reference operational status. Subsequently, from the storage unit 42, the extraction unit 34 extracts a motion image in a predetermined period including a period preceding the deviation from the reference operational status. The extraction unit 34 extracts a motion image including a motion image preceding the occurrence of an abnormality in the robot device 5. The predetermined period preceding the occurrence of an abnormality may be, for example, a period of one to ten minutes from the deviation from the reference operational status. In the present embodiment, the extraction unit 34 extracts a motion image in a predetermined period including the deviation from the reference operational status. The extraction unit 34 of the present embodiment, in particular, extracts a motion image from the storage unit 42 such that the motion image includes a motion image in a predetermined period subsequent to the deviation from the reference operational status. The predetermined period subsequent to the occurrence of an abnormality may be, for example, a period of one to ten minutes from the deviation from the reference operational status. In this way, from the storage unit 42, the extraction unit 34 extracts a motion image in a period around the timing at which the operational status of the robot device 5 deviates from the reference operational status.

The extraction unit 34 may not extract a motion image after the deviation from the reference operational status. However, the extraction of a motion image after the deviation from the reference operational status allows an operator to confirm a status by video after the occurrence of an abnormality. For example, the operator can confirm a status of damage to the device.

The extraction unit 34 then stores the extracted motion image in the storage unit 42. Moreover, the extraction unit 34 may extract, from the monitoring information file 73, information in a predetermined period preceding the occurrence of an abnormality in the operational status of the robot device 5 and store the information in the storage unit 42.

In this way, the monitor device of the present embodiment acquires a motion image of the assembly area of the workpieces 81 and 82 during the operation period of the robot device 5. In the event of an abnormality in the operational status of the robot device 5, the monitor device extracts a motion image in a predetermined period including a motion image of a period preceding the occurrence of the abnormality in the operational status of the robot device 5, and then the monitor device stores the motion image in the storage unit 42.

A motion image immediately before the deviation of the robot device 5 from the reference operational status and a variable number acquired from the output of the status detector are stored in the storage unit 42. Thus, it is not necessary for an operator to operate the robot device 5 again so as to repeat the same operational status, achieving a quick analysis on the status of the robot device 5 in the event of an abnormality.

The operator can confirm a status of part assembly by the robot device 5 from the video 71 extracted by the extraction unit 34. Furthermore, the operator can confirm a status of the robot 1 in the event of an abnormality based on an acceleration and the position of the robot, the acceleration and position being recorded in the monitoring information file 73. Variable numbers included in the video 71 and the monitoring information file 73 are attached with times, achieving a strict correspondence between a time included in the video 71 and a time stored in the monitoring information file 73. Thus, the operator can easily analyze the cause of an abnormality. For example, the operator acquires the time of the deviation of an acceleration from the determination range from the monitoring information file 73, thereby confirming a status immediately before the time of the deviation of the acceleration from the determination range in the video 71. Since video and an operational status can be confirmed immediately after the occurrence of an abnormality in the robot device 5, the cause of the abnormality can be analyzed in a short time.

In the present embodiment, the video 71 captured by the camera 10 and a variable number acquired from the output of the status detector are stored with attached times. The embodiment is not limited to this configuration. Instead of the time, an elapsed time from a predetermined reference time may be attached to video and a variable number acquired from the output of the status detector. For example, the reference time may be the start time of an operation performed by the robot device, and an elapsed time from the reference time may be attached to the stored video and variable number. A time or an elapsed time to be attached to the video 71 and the variable number included in the monitoring information file 73 can be recorded in units of time specific to the device. For example, as illustrated in FIG. 3, the time may be up to one hundredths of a second or the elapsed time may be used in 1 msec units.

The camera 10 of the first robot device 5 is formed so as to be removed from the hand 2. With this configuration, the camera 10 can be attached or detached to or from the robot device 5 in any period. For example, in a period during which the robot device produces a normal motion, the camera can be removed. The camera may be attached if the robot device is likely to produce an abnormal motion. For example, when a warning is issued about a motion of the robot device, the camera may be attached to monitor the motion status of the robot device. The camera 10 of the first robot device 5 is fixed to the hand 2, but the embodiment is not limited to this. The camera may be fixed to the robot. For example, the camera may be fixed to the flange of the wrist of the robot.

Time intervals for storing, in the storage unit 42 by the storage control unit 32, variable numbers acquired from the output of the status detector may be the same time intervals as a control period for transmitting the motion command of the robot 1 by the motion control unit 43. The storage control unit 32 can acquire the output of the status detector concurrently with a period for transmitting the motion command of the robot 1 by the motion control unit 43. Information on the variable numbers of times is added to the monitoring information file 73 in each control period.

Figure 5:
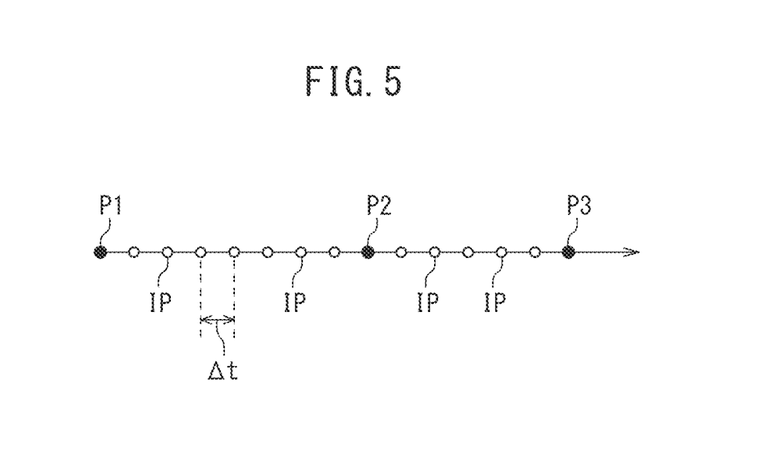
FIG. 5 is a schematic diagram for explaining interpolation points between movement points described in a motion program.

FIG. 5 is an explanatory drawing of the control period transmitted by the motion control unit of the controller. FIG. 5 indicates movement points P1, P2, and P3 described in the motion program 41. The robot 1 is controlled so as to move, for example, a tool center point from the movement point P1 to the movement point P2. Furthermore, the robot 1 is controlled so as to move the tool center point from the movement point P2 to the movement point P3. In the motion program 41, the positions of the movement points P1, P2, and P3 and the postures of the robot 1 at the respective positions are determined.

The motion control unit 43 transmits the motion command to the robot 1 in a predetermined control period Δt. The control period Δt is determined in advance according to the performance of the robot 1. Alternatively, the control period Δt may be inputted to the robot controller 4 by an operator. The control period Δt of the robot 1 is, for example, a time ranging from 1 msec to 10 msec.

The motion control unit 43 acquires the positions and postures of the robot 1 at the movement points P1, P2, and P3 from the motion program 41. The motion control unit 43 then adds interpolation points IP between the movement points P1, P2, and P3. The interpolation points IP are generated based on the time intervals of the control period Δt of the robot 1. The interpolation points IP are also generated based on the driving speed of the robot 1 and the driving method (motion plan) of the robot 1 such as a linear movement.

The motion control unit 43 calculates the position and posture of the robot 1 at each of the interpolation points IP.

Moreover, the motion control unit 43 calculates the operating speed of the robot 1 at each of the interpolation points IP. The motion control unit 43 transmits a motion command for each of the interpolation points IP. The positions and postures of the robot 1 are controlled so as to pass through the movement points P1, P2, and P3 and the interpolation points IP. Alternatively, the robot 1 is controlled so as to pass by the movement points P1, P2, and P3 and the interpolation points IP.

The storage control unit 32 can store, in the storage unit 42, variable numbers (measured values) acquired from the output of the status detector in each control period of the robot 1. Furthermore, the storage control unit 32 may store, in the storage unit 42, a command value transmitted from the motion control unit 43 in each control period of the robot 1. The control period is a minimum time interval for driving the robot 1. Thus, missing records on the status of the robot can be suppressed by recording variable numbers in the monitoring information file 73 at the time intervals of the control period. Moreover, an operator can analyze the abnormality of a motion of the robot device 5 at the interpolation point IP.

Any monitoring information for monitoring the operational status of the robot device 5 can be recorded with an attached time in the monitoring information file 73. The monitoring information may include, for example, warning information that does not require a stop of the robot device 5. For example, in addition to an acceptance value for determining the abnormality of a motion of the robot 1 with respect to an acceleration, a determination range for a warning of the approach of the acceptance value may be determined in advance. If the determination unit 33 detects that the acceleration of the robot 1 has reached the determination range of a warning, the storage control unit 32 may attach a time to information on the warning and record the information in the monitoring information file 73.

The motoring information may include information on the command statement of the motion program 41 corresponding to a motion of the robot device 5. For example, information on the lines of the command statement for executing the motion program 41 may be recorded with times. Alternatively, the information on the lines of the command statement for executing the motion program 41 may be recorded with variable numbers such as an acceleration.

In the motion program 41, motion groups for devices constituting the robot device 5 may be set. A motion group for the driving of the robot 1, a motion group for the driving of the hand 2, and a motion group for the driving of the conveyor 8 may be determined for the motion program 41. The motoring information may include information on the motion groups. For example, a first motion group for the driving of the robot 1 can be recorded with variable numbers such as an acceleration in the monitoring information file 73.

In the motoring information, information on the interpolation points generated between the movement points described in the motion program may be included with times. For example, the motoring information may include information on the control period between the interpolation points and the motion plan. The motoring information may further include information on positions, speeds, accelerations, and jerks at the interpolation points. In this case, the positions, speeds, and the like at the interpolation points can be calculated by acquiring the output of the status detector by means of the storage control unit 32 at the same time intervals as the control period. Furthermore, the information on the interpolation points may be the command value of the position of the robot 1, the command value being transmitted from the motion control unit 43. Alternatively, the monitoring information may include both of a measured value that is calculated from the output of the status detector and a command value that is transmitted from the motion control unit 43.

At least one of the warning information, the information on the command statement of the motion program, and the information on the interpolation points is recorded in the monitoring information file 73, allowing an operator to more specifically analyze the cause of a deviation of the robot device 5 from the reference operational status.

Referring to FIG. 2, the signal processing unit 31 of the present embodiment includes the prediction unit 35 that predicts a future motion of the robot 1. The prediction unit 35 acquires the monitoring information file 73 of the previously recorded operational statuses of the robot from the storage unit 42. In this example, variable numbers are stored in the monitoring information file 73 at each control period. The prediction unit 35 estimates the position of the robot 1 after driving the robot by a subsequent motion command issued at each control period, based on variable numbers acquired from the output of the status detector. For example, the prediction unit 35 can estimate the position of the robot after driving the robot by a subsequent motion command, from the current position and the previous position of the robot according to linear approximation. The prediction unit 35 repeats control for estimating a position at which the robot reaches by a subsequent motion of the robot 1 at each control period.

The determination unit 33 determines whether the robot 1 can reach the position of the robot 1 as estimated by the prediction unit 35. For example, the estimated position of the robot 1 may exceed the range of motion of the robot 1. Moreover, when the position of the robot 1 is determined, the rotation angle of the robot drive motor 22 on each drive axis is calculated based on inverse kinematics. At this point, the rotation angle of the robot drive motor 22 may not be calculated. This movement point of the robot 1 will be referred to as a singular point. In this case, the determination unit 33 determines that the position of the robot 1 after driving the robot by a subsequent motion command is a position that is not reachable by the robot 1.

If the robot 1 cannot reach the position estimated by the prediction unit 35, the signal processing unit 31 transmits, to the motion control unit 43, a command for stopping the robot 1 before the robot 1 is driven by a subsequent motion command. The motion control unit 43 performs control for stopping the robot 1 without transmitting a subsequent motion command, based on the command from the signal processing unit 31.

If the position and posture of the robot are corrected by using a visual sensor, a plurality of positions may be reachable by the robot 1 according to a subsequent motion command. In this case, the determination unit 33 can determine whether each position exceeds the range of motion or is a singular point. If at least one position exceeds the range of motion or is a singular point, the determination unit 33 can determine that the estimated position of the robot 1 is not reachable by the robot 1.

In the robot device 5, visual feedback control for correcting the position and posture of the robot 1 may be performed based on a motion image or a still image of a workpiece moved by a conveyor or the like, the image being captured by the visual sensor such as a camera. In the visual feedback control, the position and posture of the robot 1 are changed so as to follow a workpiece moved by a conveyor or the like.

For example, the position and posture of the robot 1 can be adjusted such that the characteristic point of a moving workpiece in video captured by a camera is located at a predetermined reference position. The positional relationship of the robot relative to the workpiece is determined in advance when the characteristic point of the workpiece is located at the reference position in the video. Thus, the robot controller 4 can control the robot 1 to the position and posture of the robot 1 in order to perform an operation based on the position and posture of the robot 1 when the characteristic point of the workpiece is located at the reference position in the video.

Moreover, the position and orientation of the workpiece in the reference coordinate system 56 can be calculated based on video captured by the camera when the workpiece is moved by a conveyor or the like. For example, the position and orientation of the workpiece can be calculated according to a method of pattern matching. The robot controller 4 can control the robot 1 such that the robot 1 is located at the position and posture for performing an operation based on the position and orientation of the workpiece at the time when an image is captured by the camera.

In the visual feedback control, the position and posture of the robot 1 are changed according to the position and orientation of the workpiece, leading to difficulty in estimating a future position and posture of the robot in advance. However, the prediction unit 35 of the present embodiment can estimate the position of the robot at a time close to the current time based on past monitoring information. Thus, the robot 1 can be stopped before the motion of the robot 1 becomes abnormal. Variable numbers acquired from the output of the status detector at each control period are particularly stored in the storage unit 42 by the storage control unit 32, thereby estimating the position of the robot after driving the robot by a subsequent motion command.

In the present embodiment, the acceleration sensor 19 is attached to the hand 2 in order to detect the acceleration of the robot 1. The embodiment is not limited to this. For example, the camera 10 may include an acceleration sensor for compensating for image blurring caused by hand-held camera shake. If the camera 10 includes an acceleration sensor, the output value of the acceleration sensor of the camera can be used as the acceleration of the robot 1. Alternatively, the acceleration of the robot 1 may not be directly detected by the acceleration sensor. The acceleration may be calculated by differentiating the output of the position detection 18 twice. For example, an acceleration at a predetermined position, e.g., a tool center point may be calculated based on the output of the position detector 18.

Figure 6:
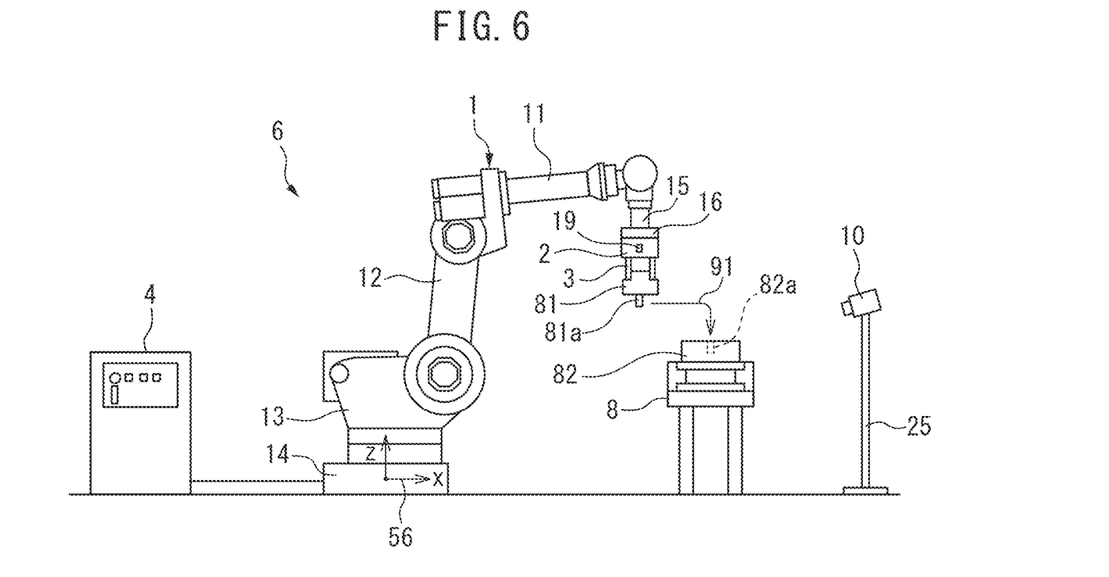
FIG. 6 is a schematic diagram of a second robot device according to the embodiment.

FIG. 6 is a schematic diagram of a second robot device according to the present embodiment. In the first robot device 5, the camera 10 is attached to the hand 2. The camera 10 moves with the driven robot 1, but the embodiment is not limited to this. The camera 10 may be fixed at a position remote from the robot 1 and the conveyor 8.

A second robot device 6 includes a pedestal 25 fixed on a floor. The camera 10 is fixed to the pedestal 25. The camera 10 is disposed so as to capture an image of a status in which the hand 2 performs an operation to the workpieces 81 and 82. The camera 10 is disposed so as to capture an image of a state in which the pin 81a of the workpiece 81 is inserted into the hole 82a of the workpiece 82.

Furthermore, the second robot device 6 may capture an image of an area other than the area in which the robot device 5 performs an operation. By adopting this configuration, an operator can confirm, in the video, a phenomenon occurring in an area other than the area in which the operation tool perform the operation to the workpiece. For example, the camera 10 may be disposed so as to capture an image of the overall robot 1. By adopting this configuration, the camera 10 can capture the images of all the motions of the robot 1. For example, an operator can confirm in the video that an operator or another device that comes into contact with the rotation base 13 of the robot 1. Other configurations, operations, and effect of the second robot device 6 are identical to those of the first robot device 5.

Figure 7:
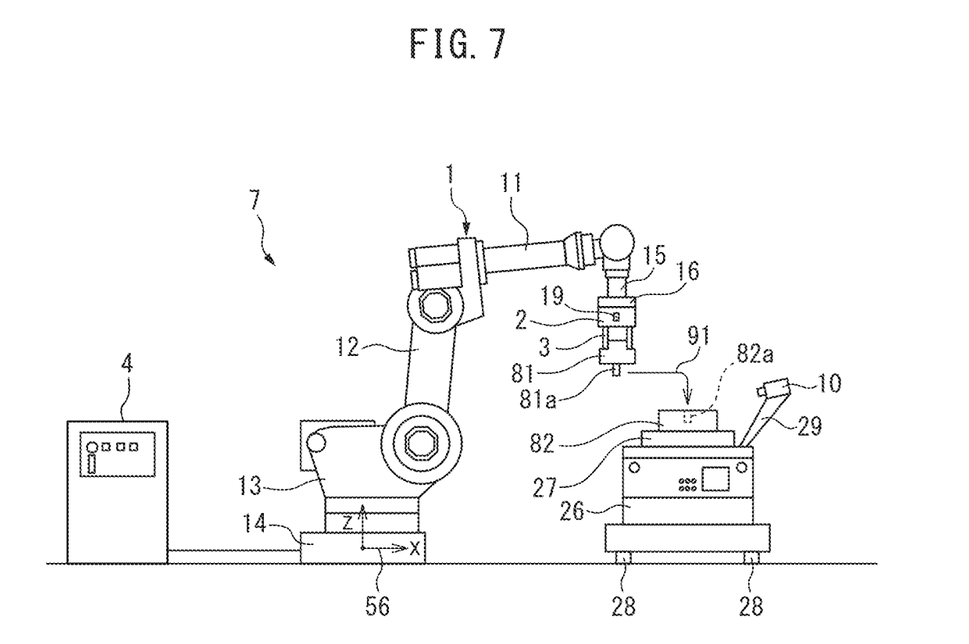
FIG. 7 is a schematic diagram of a third robot device according to the embodiment.

FIG. 7 is a schematic diagram of a third robot device according to the present embodiment. In the first robot device 5 and the second robot device 6, the workpiece 82 is transferred by the conveyor 8. The embodiment is not limited to this. The third robot device 7 includes a conveyance vehicle 26 that acts as a transporter for transferring the workpiece 82 to the robot 1. The conveyance vehicle 26 includes wheels 28 and travel in any direction on the floor. The conveyance vehicle 26 of the present embodiment is an unmanned vehicle that automatically transfers the workpiece 82 based on the motion program 41.

The third robot device 7 includes a conveyance vehicle controller that controls the conveyance vehicle 26. The conveyance vehicle controller includes an arithmetic processing device (computer) including a CPU as a processor and RAM. The conveyance vehicle controller is formed so as to communicate with the robot controller 4.

The workpiece 82 is fixed on the top surface of the conveyance vehicle 26 with a fixing member 27 interposed therebetween. The conveyance vehicle 26 moves along a predetermined path. The position and posture of the robot 1 are changed so as to insert the pin 81a of the workpiece 81 into the hole 82a of the workpiece 82. In the third robot device 7, the camera 10 is fixed to the conveyance vehicle 26 with a support member 29 interposed therebetween. The camera 10 moves with the conveyance vehicle 26.

Also in the third robot device 7, the same control can be performed as in the first robot device 5. Also in the case where the conveyance vehicle 26 is used as a transporter, the camera 10 may be fixed at a position remote from the conveyance vehicle 26 as in the second robot device 6 (see FIG. 6). Other configurations, operations, and effect of the third robot device 7 are identical to those of the first robot device 5 and the second robot device 6.

The robot controller 4 of the present embodiment includes the display 46 that displays the monitoring information file 73 and the video 71. The embodiment is not limited to this. The robot controller may not include the display. The monitoring information file and video extracted by the extraction unit may be transmitted to another device via a communication device. For example, the information can be transmitted to an operator in the section for analyzing an abnormality of the robot device.

The embodiment illustrated the robot device that performs an operation on the workpiece 82 moved by the transporter, but the embodiment is not limited to this. The monitor device of the present embodiment is also applicable to a robot device that performs an operation on a stopped workpiece.

The embodiment illustrated the position detector and the acceleration sensor as status detectors. The embodiment is not limited to this. The status detector may be any detector capable of detecting a status of the robot device. For example, the status detector may include a temperature sensor, a torque sensor, a speed sensor, or a force sensor that is attached to the robot device.

The embodiment illustrates the robot device for assembling parts. The embodiment is not limited to this. The monitor device of the present embodiment is applicable to a robot device for performing any operation. For example, the monitor device of the present embodiment is applicable to a robot device for transferring a workpiece, a robot device for welding such as spot welding or arc welding, a robot device for painting, a robot device for applying a sealant, or the like.

According to the present disclosure, the monitor device is provided so as to easily confirm a status of a motion of the robot device when the motion of the robot device deviates from a reference operational status.

In the forgoing control, the order of steps can be optionally changed as long as the functions and effects are not modified.

The foregoing embodiment can be optionally combined with another. In the drawings, the same or equivalent parts are indicated by the same reference numerals. The foregoing embodiment is merely exemplary and does not limit the invention. The embodiment includes the modifications described in the claims.

The invention claimed is:

1. A monitor device for monitoring a motion of a robot device including a robot and an operation tool attached to the robot, the monitor device comprising:
   a camera for capturing a motion image of a motion of the robot device;
   a status detector for detecting an operational status of the robot device; and
   an arithmetic processing device for acquiring the motion image captured by the camera and an output of the status detector; wherein
   the arithmetic processing device including:
      a storage unit for storing predetermined information;
      a storage control unit for operating the information stored in the storage unit;
      an extraction unit for extracting part of the information stored in the storage unit; and
      a determination unit for determining the operational status of the robot device, the storage control unit is configured to perform
      control for storing a motion image in the storage unit, the image being captured by the camera and attached with a time or an elapsed time from a predetermined reference time,
      control for storing a variable number in the storage unit, the variable number being acquired from the output of the status detector and attached with the time or the elapsed time, and
      control for deleting a motion image captured before a predetermined period preceding a current time,
   the determination unit is configured to determine whether the operational status of the robot device deviates from a predetermined reference operational status, and
   in response to a determination by the determination unit that the operational status of the robot device deviates from the reference operational status, the extraction unit is configured to extract, from the storage unit, a first motion image captured in a predetermined period including a first period preceding the deviation from the reference operational status and store the extracted first motion image in the storage unit, wherein
   the storage control unit is configured to perform control for
      acquiring an acceleration in at least one axis direction of a reference coordinate system of the robot,
      acquiring a time when the acceleration is acquired,
      attaching the acceleration and the time to a monitoring information file, and
      recording the operational status of the robot device as monitoring information in the monitoring information file during operation of the robot device.

2. The monitor device according to claim 1, wherein the camera is disposed so as to capture an image of a state in which the operation tool performs an operation to the workpiece.

3. The monitor device according to claim 1, wherein in response to a determination by the determination unit that the operational status of the robot device deviates from the reference operational status, the extraction unit is configured to extract a second motion image captured in a second period subsequent to the deviation from the reference operational status and store the extracted second motion image in the storage unit.

4. The monitor device according to claim 1, wherein
   the arithmetic processing device includes a motion control unit for transmitting a motion command of the robot at every predetermined control period, and
   the storage control unit is configured to store, in the storage unit, variable numbers acquired from the output of the status detector at the same time intervals as the control period of the robot.

5. The monitor device according to claim 4, wherein the arithmetic processing device includes a prediction unit for predicting a motion of the robot,
   the prediction unit is configured to estimate a robot position of the robot after driving the robot by a subsequent motion command based on the variable numbers acquired from the output of the status detector and stored in the storage unit,
   the determination unit is configured to determine whether the robot position estimated by the prediction unit is reachable by the robot, and
   in response to a determination that the robot position estimated by the prediction unit is not reachable by the robot, the motion control unit is configured to stop the robot before the robot is driven by the subsequent motion command.

6. The monitor device according to claim 1, wherein the variable number acquired from the output of the status detector includes at least one of the acceleration of the robot and a position of the robot.

7. The monitor device according to claim 1, wherein the storage control unit is configured to store, in the storage unit, at least one of
   information on a warning of an operation of the robot device,
   information on a command statement of a motion program corresponding to a motion of the robot device, and
   information on interpolation points generated between movement points described in the motion program, the information being attached with a time or the elapsed time.

8. The monitor device according to claim 1, wherein the information stored in the storage unit includes warning information that does not require a stop of the robot device.

9. The monitor device according to claim 1, wherein the determination unit is configured to determine, in advance, a determination range for a warning of approach of an acceptance value, in addition to the acceptance value for determining abnormality of a motion of the robot with respect to the acceleration.

* * * * *